United States Patent [19]

Rostoker et al.

[11] Patent Number: 5,131,926
[45] Date of Patent: Jul. 21, 1992

[54] VITRIFIED BONDED FINELY MILLED SOL GEL ALUMINOUS BODIES

[75] Inventors: David Rostoker, Sturbridge; Carole J. Markhoff-Matheny, Leicester, both of Mass.

[73] Assignee: Norton Company, Worcester, Mass.

[21] Appl. No.: 669,819

[22] Filed: Mar. 15, 1991

[51] Int. Cl.$^5$ .......................... B24D 17/00; C09C 1/68
[52] U.S. Cl. ........................................ 51/309; 51/293; 51/295
[58] Field of Search ............................ 51/293, 295, 309

[56] References Cited

U.S. PATENT DOCUMENTS

| | | |
|---|---|---|
| 4,314,827 | 2/1982 | Leitheiser et al. ............ 51/298 |
| 4,518,397 | 5/1985 | Leitheiser et al. ............ 51/293 |
| 4,539,049 | 9/1985 | Cohen ............................ 106/287.17 |
| 4,623,364 | 11/1986 | Cottringer et al. ............ 51/309 |
| 4,744,802 | 5/1988 | Schwabel ....................... 51/309 |
| 4,913,708 | 4/1990 | Kalinowski .................... 51/295 |
| 4,954,462 | 9/1990 | Wood et al. .................... 501/95 |
| 4,964,883 | 10/1990 | Morris et al. .................. 51/293 |
| 4,997,461 | 3/1991 | Markhott-Matheny ........ 51/295 |

Primary Examiner—Mark L. Bell
Assistant Examiner—Deborah Jones
Attorney, Agent, or Firm—David Bennett

[57] ABSTRACT

Vitrified bonded abrasive bodies prepared from sol-gel sintered aluminous grit particles and a vitreous (glass) bond exhibit improved abrasive performance by coating the surfaces of the grit particles with a metal oxide, preferably by means of an organofunctional metal-containing surfactant having a metal content of at least about 10 weight percent.

23 Claims, No Drawings

VITRIFIED BONDED FINELY MILLED SOL GEL ALUMINOUS BODIES

TECHNICAL FIELD

This invention relates to vitrified (glass) bonded sol-gel sintered aluminous abrasive bodies, e.g. superfinishing sticks, grinding wheels, segments, sharpening stones, and the like, which are prepared from fine particles, particularly those having an average particle size of less than about 20 μ (microns), of sintered aluminous material. The particles are modified before being mixed with a vitrified bond composition by coating the surfaces thereof with a sufficient amount of a compound which will form a metal oxide which will prevent the bond composition from reacting with sol-gel aluminous particles. Preferably the particles are coated with an organometallic surfactant which contains at least about 10 weight % metal and which will generate the metal oxide during the initial stages of the maturing of the vitrified bond.

It has been found that improved vitreous-bonded abrasive articles can be prepared by coating the surface of aluminous sol-gel abrasive particles with an organofunctional metal-containing surfactant which contains at least about 10 weight % metal. This is particularly so when the particles have an average particle size of less than about 20μ which particles have heretofore not been usable to form commercially useful vitrified abrasives. The coatings have been found particularly effective when placed on the particles during a milling procedure which is utilized to obtain the desired average particle size.

BACKGROUND OF THE INVENTION

The present invention is particularly directed to vitrified bonded finishing and superfinishing sticks (also called honing sticks) which are prepared from ultrafine grain sol gel aluminous abrasive grit. Vitrified bonded abrasive products are different from resinoid bonded, i.e. phenol-aldehyde, products in that they use a glass phase to bond the grit and thus are processed at substantially higher temperatures (about 800° C. or higher for vitrified vs. about 400° C. or lower for resinoid). Due to the higher manufacturing temperature used, vitrified bonded products can withstand higher temperatures in use.

Attempts at preparing vitrified bonded products from ultrafine sol gel sintered alumina abrasive grits, especially those having an average particle size less than about 20μ, have largely been unsuccessful. Such ultrafine particles have a much higher surface reactivity than do both coarser sol-gel aluminous particles and conventional fused alumina particles. The surface reactivity has been found to be a particular problem when attempting to use such particles with vitrified bonds which are processed at elevated temperature. As a result, only very soft, poor performing products have been produced heretofore from the ultrafine particles. In fact, the products have generally been inferior to similar products prepared from conventional fused alumina. Since relatively large particle size sol-gel aluminous abrasive grits have generally demonstrated advantages over other alumina abrasive materials, there has been a desire to develop a procedure for incorporating ultrafine grits into vitrified bonds in an attempt to obtain similar substantial performance advantages. Sol-gel abrasives are generally made by forming a hydrated alumina gel which may also contain varying amounts of additives such as MgO or ZrO$_2$ and then drying and sintering the gel. See for example, U.S. Pat. No. 4,314,827. Seeded sol-gel abrasives such as those formed by the conversion of hydrated alumina to alpha alumina by the use of alpha alumina seed or functional equivalent materials having the same crystal structure and similar lattice parameters, such as ferric oxide and the like. Processes for the production of seeded sol-gel alumina materials are described, for example, in U.S. Pat. Nos. 4,623,364, 4,744,802, 4,954,462, 4,964,883, and PCT Applications WO 90/08744 and WO 90/02160. To produce abrasive material from a gel, the dried and sintered extruded gel material is usually crushed or broken by suitable means such as a hammer or ball mill to form abrasive particles which are generally then size classified. The same type of extrusion, grinding, and forming processes may be used as is done with other abrasive forming compositions than sol-gel materials.

For purposes of this application and the invention disclosed, the term "sol gel sintered alumina abrasive" is intended to apply to abrasives produced by the teachings of any of U.S. Pat. Nos. 4,518,397, 4,623,364, 4,744,802, 4,954,462, 4,964,883, and PCT Applications WO 90/08744 and WO 90/02160 as well as by other sol-gel techniques which accomplish a similar result.

U.S. Patent No. 4,997,461 discloses the use of silica-enriched surfaces on sol-gel aluminous grit to reduce deleterious interaction between a vitrified bond and said grit. It has now been discovered that when the grit particles are very fine, i.e. less than about 20 μ silica sources are such good adhesives that extensive agglomeration results during the drying of the silica-coated high surface area fine grits. The agglomerates act as coarse grains in abrasive bodies and defeat the purpose of using the fine grit particles. Silicon is a non-metal.

Accordingly, there is a need for a system which is useful particularly with very fine sol-gel aluminous grit to form vitrified bodies.

SUMMARY OF THE INVENTION

It has been found that by coating the surfaces of aluminous sol-gel abrasive grit particles with an organofunctional metal-containing surfactant which contains at least about 10 weight % metal before the grit is blended with a vitreous bond and processed into a vitreous-bonded body, the surfaces of the particles can be converted to a metal oxide during the initial stages of maturing of the bond by pyrolysis of the organic portion of the surfactant. The resulting metal oxide coating protects the grit from reaction with the vitreous bond composition. This has been found to significantly improve the grinding performance of the resultant body, especially when the grit particles having an average particle size of less than about 20μ. Such sol-gel grits have demonstrated a particularly substantial improvement from being coated.

DETAILED DESCRIPTION OF THE INVENTION

The vitrified bonded abrasive bodies of the present invention are comprised of sol-gel aluminous grits, at least a portion of which have been coated with a metal oxide by means of an organometallic surfactant which contains at least about the initial stages of maturing of the vitrified bond, and a vitreous bond.

The aluminous grits are prepared by a sol-gel technique which generally entails crushing and firing a dried gel prepared from a hydrated alumina such as microcrystalline boehmite, water, and an acid such as nitric acid. The initial sol may further include up to about 10-15 weight % of spinel, mullite, manganese dioxide, titania, magnesia, ceria, zirconia powder or a zirconia precursor which can be added in larger amounts, e.g. 40% or more, or other compatible additives or precursors thereof. The additives are normally included to modify such properties as fracture toughness, hardness, friability, fracture mechanics, or drying behavior. In its most preferred embodiment, the sol or gel includes a dispersed submicron crystalline seed material or a precursor thereof in an amount effective to facilitate the conversion of the hydrated alumina particles to alpha alumina upon sintering. Suitable such seeds are well known to the art. The amount of seed material should generally not exceed about 10 weight % of the hydrated alumina and there is normally no benefit to amounts in excess of about 5%. If the seed is adequately fine (preferably about 60 m² per gram or more), amounts of from about 0.5 to 10% may be used with about 1 to 5% being preferred. The seeds may also be added in the form of a precursor such as ferric nitrate solution. The preparation of suitable gels, both with and without seeds, is well known in the art, as are the crushing and firing procedures. Further details thereon are readily available in the literature and thus not included here.

Each aluminous grit so prepared is made up essentially of numerous non-cellular alpha alumina crystals having a crystal size of less than about 10 microns, preferably less than about 1 micron. The abrasive has a density of at least about 95% of theoretical density.

Suitable aluminous grits for use herein may have an average particle size ranging from as large as about 500 μ to as small as submicron, as determined by Coulter Counter. Preferably the average particle size is less than about 20μ. More preferably the average particle size is less than about 15μ. Still more preferably the average particle size is less than about 10μ. Most preferably the average particle size is less than about 7μ.

To produce the metal oxide coatings the aluminous grits are coated with an organofunctional metal surfactant which contains at least about 10 weight % metal. Preferably the surfactant contains at least about 15 weight % metal. Most preferably the surfactant contains at least about 18 weight % metal. Such surfactants contain both organic and metallic functionality which enables an irreversible chemical interaction to occur with the surfaces of the aluminous grit. The specific chemical composition of the surfactants, other than the metal content and that the metal forms an oxide coating on the aluminous particles, has not been found to be important. This is as expected because the resultant metallic oxide coating is believed to function as a sacrificial layer protecting the aluminous grit from undesirable reaction with the vitreous bond during firing. The layer is substantially completely pyrolyzed during heating to elevated temperature which melts the vitreous bond and form the desired solidified abrasive body. Any organofunctional metallic surfactant which substantially completely coats the surface of the individual aluminous grit particles may be used in the present invention. Differences in performance among coatings are likely due to variations in either the degree of adherence of a particular surfactant to the grit surfaces or the depth of the surfactant layer which is formed, or the amount of metal oxide on the grit surfaces after pyrolyzation.

The organic functionality serves primarily to attracting the organometallic compound to the hydrophilic surfaces of the grit particles and assists in producing a substantially uniform coating on individual sol-gel aluminous grits. Examples of suitable functional groups include such as: amino, carboxy, alkyl, vinyl, acrylo, methacrylo, and mercapto. The metal component of the surfactant may include such elements as aluminum, zirconium, titanium, iridium, and mixtures thereof. Organofunctional metallic surfactants containing these functional groups and having a sufficiently high metal content are readily available from numerous commercial sources.

Suitable surfactants useful herein include zircoaluminate surfactants having an inorganic polymer backbone (from Manchem Limited, Manchester, U.K.), titanium alkoxides, aluminum alkoxides, zirconium alkoxides, iridium-based surfactants, and the like, provided that they have a sufficiently high metal content. Preferably, the surfactant is an organofunctional zircoaluminate. Still more preferably, the zircoaluminate surfactant is the reaction product of a chelated aluminum moiety, an organofunctional ligand, and a zirconium oxyhalide, the organofunctional ligand being complexed with and chemically bound to the chelated aluminum moiety, the aluminum moiety having the formula $Al_2(OR_1O)_aA_bB_c$, wherein each of A and B is hydroxy or halide and each of a, b, and c are integers such that $2a+b+c=6$, and $OR_1O$ is (a) an alpha, beta or an alpha, gamma glycol group in which $R_1$ is an alkyl group having about 1 to about 6 carbon atoms or (b) an alphahydroxy carboxylic acid residue having the formula:

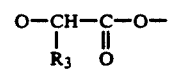

wherein $R_3$ is H or an alkyl group having about 1 to about 4 carbon atoms; said organofunctional ligand being (a) an alkyl, alkenyl, alkynl, or aralkyl carboxylic acid having about 2 to about 36 carbon atoms, (b) an aminofunctional carboxylic acid having about 2 to about 18 carbon atoms, (c) a dibasic carboxylic acid having about 2 to about 18 carbon atoms, (d) an acid anhydride of a dibasic acid having about 2 to about 18 carbon atoms, (e) a mercapto functional carboxylic acid having about 2 to about 18 carbon atoms, or (f) an epoxy functional carboxylic acid having about 2 to about 18 carbon atoms; said zirconium oxyhalide moiety having the formula $ZrA_dB_e$, wherein A and B are as above defined and d and e are integers such that $d+e=4$; the molar ratio of chelated aluminum moiety to zirconium oxyhalide moiety being about 1.5 to about 10; and the molar ratio of organofunctional ligand to total metal being about 0.05 to about 2. The synthesis and chemical structure of such zircoaluminates are set forth in U.S. Pat. No. 4,539,049, the subject matter of which is hereby incorporated by reference.

The coating of the sol-gel aluminous grit with the organofunctional metal-containing surfactants may be accomplished by uniformly blending the grit with the desired amount of the surfactant with sufficient mixing to achieve coating. The coating may be performed at any point in the manufacturing process before the grit and vitreous bond components are blended to form the desired abrasive body, i.e. the coated grit may be stored for future use. To improve the adhesion of a coating to a grit and to produce a more substantially complete coating, it is desirable for the surfactant to contact fresh grit surfaces. The easiest way to accomplish this has been found to be adding the surfactant to water which is mixed with the grit and then wet milling the mixture for at least a short period of time, e.g. 15-20 minutes. A short milling will slightly reduce the average particle size of the grit. Thus when pre-classified grit of a specific size is used, it should generally be at the coarse end of its specification so that after milling it is still within specification. When the grit is to be classified after the milling, conventional milling techniques can be used with the surfactant merely added to the mill mix. In such a case, the milling usually continues for many hours though the surfactant does serve as a milling aid.

The amount of the organofunctional metallic surfactant used should be at least about substantially sufficient to substantially completely coat the grit particles with a metal oxide coating after the organic portion is pyrolyzed. Thus, suitable amounts are generally in the range of about 0.5 to about 5, preferably about 0.7 to about 3, most preferably about 0.75 to about 2 wt % based upon the weight of the grit. No advantage has been observed from using more than a small excess over the amount which will essentially completely metal oxide coat all of the grit surfaces.

The abrasive products of this invention are bonded with a vitrified bond. Any conventional vitreous bond composition may be used in the present invention since the organofunctional metallic surfactant when pyrolyzed in sites as the green body is heated generates a metal oxide coating which serves as a sacrificial layer which protects the aluminous grit from detrimental interactions between the bond components and the grit. To form the bond, the vitreous composition is fired at an elevated temperature, i.e. generally from about 800° to about 1200° C. Suitable vitreous bond compositions are commercially available from 0. Hommel Company of Pittsburg, Pa., Etes L'Hospied of Valluria, France and others. The bond may include up to about 50% by volume fillers or grinding aids, as is well known in the art. Vitrified bonds, while amenable to the incorporation of fillers, somewhat limit the useful materials because of the high temperatures required to mature such bonds. Thus suitable fillers include such materials as kyanite, mullite, nepheline syenite, graphite, and molybdenum disulfide, depending upon the maturing temperature of a particular vitrified bond.

The abrasive bodies may include one or more secondary abrasives in amounts of about 1 to 90% by volume of the total body. The secondary abrasive may act as a filler if, for example, it is finer in grit size, or as an auxiliary or secondary abrasive, if it is coarser. In some grinding applications the second abrasive will function as a diluent for the coated sol-gel aluminous abrasive grit. In other applications, the second abrasive may even enhance the overall grinding properties of the vitrified-bonded product, either in overall efficiency or in finish imparted to the material being ground. The second abrasive may be such as a fused alumina, sintered alumina-zirconia, silicon carbide, cubic boron nitride, diamond, flint, garnet, bubbled alumina, bubbled alumina-zirconia, and the like.

Conventional pore inducing media such as hollow glass beads, solid glass beads, foamed glass particles, bubbled alumina, as well as organic materials that will burn out such as wax fine walnut shells, methylcellulose, and the like may be incorporated into the present bodies thereby providing more latitude with respect to grade and structure number variations.

The abrasive bodies of the present invention are comprised of aluminous grits, at least a portion of which (though preferably all) have been coated as described, and a vitrified bond. The specific quantities of abrasive and bond used may vary widely depending upon the particular end use of the final body. Suitable compositions can range from about 3 to 75% bond, about 25 to 90% abrasive, and 0 to 70% pores, all by volume. Preferably, the bodies will comprise about 5 to 40% bond, about 30 to 85% abrasive, and about 0 to 65% pores.

After firing at conventional conditions determined primarily by the actual bond used, the vitrified bonded body may be impregnated in a conventional manner with additives to improve grinding performance. For example, molten sulfur, canuba wax, or epoxy resins may be used.

The abrasive bodies are suitable for grinding all types of metal such as various steels such as stainless steel, cast steel, hardened tool steel, cast irons, ductile iron, malleable iron, spheroidal graphite iron, chilled iron and nodular iron, as well as metals like chromium, titanium, and aluminum. As is the case with all abrasives and the vitrified bonded bodies containing them, the abrasives and the bonded bodies of the invention will be more effective grinding some metals than others and will be more efficient in some grinding applications than in others.

Particularly desirable products produced hereby are finishing and superfinishing sticks. Such products are comprised of vitrified bond and ultrafine grit particles, i.e. having an average particle size less than about 20$\mu$ preferably less than about 10$\mu$ and most preferably less than about 7$\mu$. Generally the sticks contain about 5 to 40 wt % vitrified bond and 60 to 95 wt % abrasive particles, preferably about 8 to 20 wt % bond and about 75 to about 95 wt % abrasive particles. Generally at least about 40% of the abrasive grit particles are the coated aluminous particles of this invention with the balance, if any, being any of the secondary abrasives described above, preferably fused alumina or silicon carbide.

A suitable process for preparing the finishing sticks entails the steps of (i) blending together a mixture of the abrasive particles and the vitreous bond composition along with about 1 to 12 wt % of a suitable binder, e.g. a liquid sugar, to provide green strength, and optionally up to about 3 wt % water; (ii) screening the blend to remove and break up any agglomerates which have formed during the blending; (iii) molding the screened blend into a desired shape at room temperature and under pressure; and (iv) firing the molded shape at elevated temperature to mature the bond.

In the following non-limiting examples, all parts and percents are by weight unless otherwise specified. Also, the term "abrasive grit" is used herein to refer to individual particles of the abrasive material.

COMPARATIVE EXAMPLE A

Sintered seeded sol-gel alumina abrasive grit fines were collected and classified to produce a series of grits of sizes F600 (average particle size 8.3-10.3 $\mu$), F800 (5.5-7.5 $\mu$), F1000 (3.7-5.3 $\mu$), and F1200 (2.5-3.5 $\mu$). The various grits were evaluated as superfinishing abrasives in comparison with conventional white alumina superfinishing products of the same grit size. The fine sol-gel grits contained no surface coatings.

Abrasive sticks were prepared in accordance with the general procedure of Example I below, except that no silicon carbide particles were present and a different commercial vitreous bond was used. The sticks were evaluated in accordance with the basic procedure of Example II below using a 52,100 steel workpiece having a Rockwell hardness of 58-62 on a Supfina superfinishing head mounted on a lathe with Lubrx Honing oil 150.

The comparative tests demonstrated that there was a substantial reduction in body strength for the finishing sticks prepared from the very fine sol-gel grits and the vitreous bond. Rather than the sol-gel grits producing superior products as had been expected, or even equivalent products, to the white alumina grits, the sol-gel products were substantially inferior. Specific results indicated that (i) the sol-gel products were substantially softer and had a lower resistance to indentation; (ii) the wear rate of the sol-gel products was at least three times greater than the white alumina products; (iii) the sol-gel products removed less than one-half metal of the white alumina products.

Direct substitution of very fine sol-gel alumina abrasive grit for white alumina grit in the vitrified bond system produced a weak, poor performing superfinishing stick lacking both the cutting and finishing ability of a conventional white alumina product of the same grit size.

EXAMPLE I

Sintered seeded sol-gel alumina abrasive grits were produced according to the teachings of commonly-owned U.S. Pat. No. 4,623,364. The grits were used to make finishing stones from two different size grits, an F800 having a nominal average particle size of 5.5-7.5 $\mu$ and an F1200 at 2.5-3.5 $\mu$. Stones having each particle size grits were made both in accordance with the present invention, i.e. with an organofunctional surfactant coating, and from conventional white alumina to compare the grinding performance.

To produce the stones of this invention, 6.81 kg of air classified grits having particle sizes less than about 20$\mu$; 10.23 kg of water; and 102 g of Manchem APG, an aminofunctional zirocoaluminate surfactant having an inorganic polymer backbone dissolved in propylene glycol (20% active), were charged into an 18 inch SWECO mill equipped with high purity alumina balls. The metal content of the surfactant is from about 20.5 to 22.0%. After milling the product was discharged, allowed to settle, decanted and dried. The dried cake was easily broken up by pushing it through a 200 U.S. mesh screen.

The grit milled for 6.5 hours (hereafter referred to as F800-SG) had the following actual particle size distribution according to Coulter counter: 94% of the cumulative mass greater than 2.02 $\mu$, 50%>7.25 $\mu$ and 3%>15.07 $\mu$. For the grit milled for 22 hours (hereafter F1200-SG), the following actual distribution was found: 94%>1.31$\mu$, 50%>2.56$\mu$, and 3%>5.26$\mu$.

For comparison purposes, conventional white fused alumina grits were prepared having the same particle sizes as the above sol-gel grits. These grits are referred to hereafter as F800-WA and F1200-WA.

Finishing sticks for the two 800 grits were prepared from a mixture of 39.5 parts of each of the above two grits, 39.5 parts of similarly size silicon carbide particles to each of the grits, 18 parts of a 50:50 mixture of L46 frit and A frit (the compositions of which are given in Table I below), 3 parts liquid corn syrup, and 1-2 parts water; blending in a Hobart-Style mixer for a total of about 40 minutes; screening the mixture to break up and remove agglomerates; re-mixing for an additional 15 minutes and re-screening; molding the resultant mixture at room temperature with a hydraulic press to form blocks 105×155×18 mm.

Finishing sticks for the two 1200 grits were prepared in the same manner except that the mixtures contained 41 parts of both the coated grits and the silicon carbide particles, 15 parts of the frit mixture, 3 parts liquid corn syrup, and 1-2 parts water.

The composition of bonds L46 and A, the mixture of which was the vitreous bond used in each of the superfinishing test sticks, is given Table I. Since the bonds are fritted bonds, their unfired and fired compositions are the same.

TABLE I

| Fused Oxide Composition of Bonds, % by weight | | |
|---|---|---|
| | L46 | A |
| SiO$_2$ | 58.1 | 73.0 |
| B$_2$O$_3$ | 15.0 | 8.0 |
| Al$_2$O$_3$ | 5.9 | 10.0 |
| CaO | 2.0 | — |
| Na$_2$O | 8.5 | 8.5 |
| K$_2$O | 2.3 | 0.5 |
| BaO | 8.2 | — |
| Total | 100.0 | 100.0 |

The blocks were air dried and then fired to 940° C. in air in 20 hours and then soaked at that temperature for 1-2 hours before being allowed to cool to room temperature. After firing, the blocks were quality checked for conformance to specifications. Finishing sticks were sliced and formed to testing requirements, i.e. the shape of a double radius body having a stone size of 6.5×17×48 mm.

EXAMPLE II

Superfinishing tests were made on O.R. (outer radius) double raw angular ball bearing series 311443, a treated ball bearing steel, with the sticks prepared in Example I. The tests were made using machine type SKF Mod FSF 130 grinding machines with the following set ups on each:

| | |
|---|---|
| Stone oscillation | 700 cycles per minute |
| Stone pressure | 1.5 atm. |
| Workpiece rotation | 1350 rpm |
| Length of oscillation | angular 10° |
| Cycle time | 6-7 seconds |

The total stock removal intended was 10-12 microns and the finish was required to exhibit an Ra height of about 0.08-0.10. The fluid used was a 50:50 mixture of cutting oil (TM55) and mill solvent. The respective F800 grit sticks were evaluated for rough operation and the F1200 sticks for finishing the same pieces, i.e. F800-WA followed by F1200-WA.

The test results shown in Table II report the number of parts or ball bearing tracks which were produced from the finishing sticks.

TABLE II

| Stick Evaluated | Parts/Tracks per Stick |
| --- | --- |
| F800-WA | 500 |
| F1200-WA | 4,000 |
| F800-SG | 940,900 |
| F1200-SG | 40,000 |

Thus, the F800-SG stick lasted nearly twice as long as the F800-WA stick and the F1200-SG stick lasted ten times as long as the F1200-WA stick. The total stock removed and surface quality produced from the SG sticks were within specification and essentially the same as the WA sticks.

COMPARATIVE EXAMPLE B

The procedure of Example I was attempted to be repeated except that the Manchem APG was replaced with a similar aminofunctional surfactant having a lower metal content. Specifically, an aminotitanate having a titanium content of 5% was used. The resultant milled product when dried was difficult to break up, leaving drying agglomerates that would be deleterious to a vitrified body. The material was not processed further.

COMPARATIVE EXAMPLE C

The procedure of Example I was attempted to be repeated except that the Manchem APG was replaced with a similar aminofunctional compound but containing silicon (a non-metal) rather than a metal. The silicon content was about 10 wt %. Specifically, a amino-silane obtained from Union Carbide as A1102 ™ organofunctional silane having a silicon content of about 10 wt % was used. The resultant milled product when dried was substantially worse than the titanate of Comparative Example B in regard to particle to particle adhesion. All reasonable attempts to break up the dried body were unsuccessful. No further processing of the material was attempted since discrete particles must be used for a proper fine grained vitrified body.

It is to be understood that means of coating the surface of sol-gel aluminous abrasives with metal oxides other than those directly cited will be apparent to those skilled in the art and that these other means are intended to be within the scope of this invention.

What is claimed is:

1. A bonded abrasive body prepared from (i) sol-gel sintered aluminous abrasive grit particles the surfaces of which are coated with a metal oxide and (ii) a vitrified bond.

2. The bonded abrasive body of claim 1, wherein the sol-gel sintered aluminous abrasive grit particles are seeded sol-gel sintered aluminous abrasive grit particles.

3. The bonded abrasive body of claim 1, wherein the sol-gel sintered aluminous abrasive grit particles have a density of at least about 95% of theoretical density and include up to about 50% by weight of an oxide selected from the group consisting of zirconia, titania, magnesia, ceria, spinel, hafnia, mullite, manganese dioxide, precursors of these oxides, and mixtures thereof.

4. The bonded abrasive body of claim 1, wherein the body consists essentially of about 25 to about 93 volume % coated abrasive, about 3 to about 7 volume % bond, and about 0 to about 70 volume % pores.

5. The bonded abrasive body of claim 1, wherein said body further includes about 1 to about 90 volume percent of a second abrasive selected from the group consisting essentially of fused alumina, cofused alumina-zirconia, sintered alumina-zirconia, silicon carbide, cubic boron nitride, diamond, flint, garnet, bubbled alumina, bubbled alumina-zirconia, and mixtures thereof.

6. The bonded abrasive body of claim 1, wherein the body is a grinding wheel.

7. The bonded abrasive body of claim 1, wherein the body is a finishing stick.

8. The finishing stick of claim 7 which comprises about 60 to 95 weight percent abrasive grit particles having an average particle size less than about $15\mu$ and about 5 to 40 weight percent vitrified bond, wherein at least about 40 weight % of the abrasive grit particles are sol-gel sintered aluminous grit particles the surfaces of which are coated with a metal oxide.

9. The bonded abrasive body of claim 1, wherein the grit particles have an average particle size of less than about $20\mu$.

10. The bonded abrasive body of claim 1, wherein the metal oxide is present in an amount sufficient to substantially prevent reaction between the particles and the vitrified bond.

11. The bonded abrasive body of claim 1, wherein the metal oxide comprises alumina.

12. The bonded abrasive body of claim 1, wherein the metal oxide comprises a mixture of alumina and zirconia.

13. Sintered sol-gel aluminous abrasive particles, the surfaces of which are coated with a metal oxide.

14. The particles of claim 13, wherein the metal oxide is present in an amount sufficient to substantially prevent a deleterious reaction between the particles and a vitreous bond when the bond is vitrified.

15. The particles of claim 13, wherein the metal oxide is selected from the group consisting essentially of alumina, zirconia, titania, iridia, and mixtures and complexes thereof.

16. A method of producing the sintered sol-gel aluminous abrasive particles of claim 13 which comprises (i) milling said particles in the presence of an organofunctional metallic surfactant for a sufficient time to adhere the surfactant to the surfaces and (ii) heating said particles to a temperature sufficient to pyrolyze the organofunctional portion of the surfactant and form the metal oxide.

17. The method of claim 16, wherein the metal of the organofunctional metallic surfactant is selected from the group consisting essentially of aluminum, zirconium, titanium, iridium, and mixtures and complexes thereof.

18. The method of claim 16, wherein the organofunctional metallic surfactant is the reaction product of a chelated aluminum moiety, an organofunctional ligand, and a zirconium oxyhalide, the organofunctional ligand being complexed with and chemically bound to the chelated aluminum moiety, the aluminum moiety having the formula $Al_2(OR_1O)_a A_b B_c$, wherein each of A and B is hydroxy or halide and each of a, b, and c are integers such that $2a+b+c=6$, and $OR_1O$ is (a) an alpha, beta or an alpha, gamma glycol group in which $R_1$ is an alkyl group having about 1 to about 6 carbon atoms or (b) an alpha-hydroxy carboxylic acid residue having the formula:

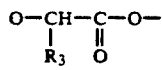

wherein $R_3$ is H or an alkyl group having about 1 to about 4 carbon atoms; said organofunctional ligand being (a) an alkyl, alkenyl, alkynl, or aralkyl carboxylic acid having about 2 to about 36 carbon atoms, (b) an aminofunctional carboxylic acid having about 2 to about 18 carbon atoms, (c) a dibasic carboxylic acid having about 2 to about 18 carbon atoms, (d) an acid anhydride of a dibasic acid having about 2 to about 18 carbon atoms, (e) a mercapto functional carboxylic acid having about 2 to about 18 carbon atoms, or (f) an epoxy functional carboxylic acid having about 2 to about 18 carbon atoms; said zirconium oxyhalide moiety having the formula $ZrA_dB_e$, wherein A and B are as above defined and d and e are integers such that $d+e=4$; the molar ratio of chelated aluminum moiety to zirconium oxyhalide moiety being about 1.5 to about 10; and the molar ratio of organofunctional ligand to total metal being about 0.05 to about 2.

19. The method of claim 16, wherein the particles are coated with about 0.5 to about 5 weight percent of the surfactant.

20. Sintered sol-gel abrasive grit particles, the surfaces of which are coated with an organofunctional metal-containing surfactant.

21. The particles of claim 20, wherein the surfactant has a metal content of at least about 10 weight %.

22. The particles of claim 20, wherein the metal is selected from the group consisting essentially of aluminum, zirconium, titanium, iridium, and mixtures and complexes thereof.

23. The particles of claim 20, wherein the surfactant is the reaction product of a chelated aluminum moiety, an organofunctional ligand, and a zirconium oxyhalide, the organofunctional ligand being complexed with and chemically bound to the chelated aluminum moiety, the aluminum moiety having the formula $Al_2(OR_1O)_aA_bB_c$, wherein each of A and B is hydroxy or halide and each cf a, b, and c are integers such that $2a+b+c=6$, and $OR_1O$ is (a) an alpha, beta or an alpha, gamma glycol group in which $R_1$ is an alkyl group having about 1 to about 6 carbon atoms or (b) an alpha-hydroxy carboxylic acid residue having the formula:

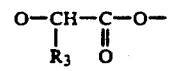

wherein $R_3$ is H or an alkyl group having about carbon atoms; said organofunctional ligand being (a) an alkyl, alkenyl, alkynl, or aralkyl carboxylic acid having about 2 to about 36 carbon atoms, (b) an aminofunctional carboxylic acid having about 2 to about 18 carbon atoms, (c) a dibasic carboxylic acid having about 2 to about 18 carbon atoms, (d) an acid anhydride of a dibasic acid having about 2 to about 1 8 carbon atoms, (e) a mercapto functional carboxylic acid having about 2 to about 18 carbon atoms, or (f) an epoxy functional carboxylic acid having about 2 to about 18 carbon atoms; said zirconium oxyhalide moiety having the formula $ZrA_dB_e$, wherein A and B are as above defined and d and e are integers such that $d+e=4$; the molar ratio of chelated aluminum moiety to zirconium oxyhalide moiety being about 1.5 to about 10; and the molar ratio of organofunctional ligand to total metal being about 0.05 to about 2.

* * * * *

UNITED STATES PATENT AND TRADEMARK OFFICE
CERTIFICATE OF CORRECTION

PATENT NO. : 5,131,926
DATED : July 21, 1992
INVENTOR(S) : David Rostoker et al

It is certified that error appears in the above-indentified patent and that said Letters Patent is hereby corrected as shown below:

Column 2, line 65 after "about" insert —10 weight % metal and which will generate the metal oxide during—

Column 12, Claim 23, line 18, after "about" insert —1 to about 4—.

Signed and Sealed this

Twenty-third Day of November, 1993

Attest:

BRUCE LEHMAN

*Attesting Officer*      *Commissioner of Patents and Trademarks*